(12) United States Patent
Kao

(10) Patent No.: US 7,299,347 B1
(45) Date of Patent: Nov. 20, 2007

(54) BOOT MANAGEMENT IN COMPUTER SYSTEMS ASSISTED BY AN ENDPOINT WITH PCI-XP OR USB-V2 INTERFACE

(75) Inventor: I-pieng Peter Kao, Sunnyvale, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 345 days.

(21) Appl. No.: 10/817,601

(22) Filed: Apr. 2, 2004

(51) Int. Cl.
*G06F 15/177* (2006.01)
*G06F 3/00* (2006.01)

(52) U.S. Cl. .......................... 713/2; 710/38; 709/220
(58) Field of Classification Search ................ 713/2, 713/1, 100; 709/222; 710/10, 38
See application file for complete search history.

(56) References Cited

U.S. PATENT DOCUMENTS

| | | | |
|---|---|---|---|
| 5,860,001 A | 1/1999 | Cromer et al. | |
| 5,937,063 A | 8/1999 | Davis | |
| 6,088,794 A | 7/2000 | Yoon et al. | |
| 6,240,519 B1 | 5/2001 | James, Jr. et al. | |
| 6,539,473 B1 * | 3/2003 | Hubacher et al. | 713/2 |
| 6,691,160 B1 * | 2/2004 | Bradley | 709/222 |
| 6,748,525 B1 * | 6/2004 | Hubacher et al. | 713/1 |
| 6,816,963 B1 * | 11/2004 | Krithivas et al. | 713/1 |
| 6,957,286 B1 * | 10/2005 | Cohen | 710/38 |
| 6,988,193 B2 * | 1/2006 | French et al. | 713/2 |

* cited by examiner

*Primary Examiner*—Suresh K Suryawanshi
(74) *Attorney, Agent, or Firm*—Bever, Hoffman & Harms, LLP; Jeanette S. Harms

(57) ABSTRACT

An intelligent endpoint can provide an automated, centralized boot management for multiple, interconnected computer systems. The intelligent endpoint can be notified of a boot event for one of the computer systems. This notification can occur over a system bus or via a system fabric. The intelligent endpoint can then decide on an appropriate action for the boot event. Notably, the action may affect or depend on a boot of another computer system. The intelligent endpoint can advantageously resolve arbitration issues in a cost- and size-efficient manner. Moreover, the intelligent endpoint can provide significant flexibility during booting.

42 Claims, 9 Drawing Sheets

BOOT MANAGEMENT IN COMPUTER SYSTEMS ASSISTED BY AN ENDPOINT WITH PCI-XP OR USB-V2 INTERFACE

BACKGROUND OF THE INVENTION

1. Field of the Invention

The present invention relates to a boot up of computer systems and in particular to an intelligent endpoint coupled to the computer systems that can manage aspects of the boot up.

2. Description of the Related Art

When a computer is turned on, a central processing unit (CPU) of the computer must "boot up". This boot up (also called a boot) of the computer loads a limited number of predetermined programs into the system memory. These programs advantageously provide the basic tools and utilities that define the initial operations of the computer system, e.g. initialization, diagnostics, and operating system loading.

The instruction code for triggering the boot up is often stored in non-volatile memory of the computer. Non-volatile cells can store bit states, i.e. 0's and 1's, even in the event of a power outage. The instruction code (bootcode) is sometimes in the form of firmware.

In one embodiment, the boot up firmware can be implemented in a type of electrically erasable non-volatile memory called electrically erasable programmable read only memory (EEPROM). In certain configurations, the EEPROM cells in an array can be simultaneously erased, and therefore are also called "flash" memory. Recently, the cost and power requirements of flash memory have been significantly reduced in a per bit base by the introduction of NAND flash memory. Influenced by this introduction, flash memory (NAND and other types of flash memory) is increasingly being used in computers for boot up firmware.

An industry standard called the peripheral connect interface (PCI) has been developed to efficiently use a bus to connect peripherals to a host platform, e.g. a computer. To address certain limitations in PCI, another industry standard called PCI Express has recently been jointly developed by Intel Corporation and the PCI Special Interest Group (PCI-SIG). PCI Express (PCI-XP) is a serial, low voltage, self-clocking I/O transfer methodology. PCI-XP typically outperforms PCI in high-speed applications but maintains backwards compatibility with PCI. Compared with PCI, PCI-XP improves data reliability and fault tolerance, thereby resulting in better reliability, availability, and serviceability (RAS).

FIG. 1 illustrates an exemplary PCI Express system that includes two computer systems, wherein each computer system is coupled to a plurality of peripherals, called endpoints herein. A first computer system 100 includes a CPU 101, a cache 102, and a platform memory 103. A second computer system 120 includes a CPU 112, a cache 113, and a platform memory 114.

Each computer system can further include a root complex and one or more switches associated with its input/output (I/O) system. A root complex is the "root" of the connection of an I/O system of the computer to its memory. Thus, a root complex 104 connects CPU 101 and memory 103. Similarly, root complex 115 connects CPU 112 and memory 114.

Each root complex is connectable to a plurality of endpoints via one or more switches. Both root complexes and switches are controlled by their associated computers. In a PCI Express system, an endpoint is a peripheral device that can request and complete PCI transactions either for itself or on behalf of a non-PCI Express device (e.g. a legacy device). A switch can be used to direct traffic in a PCI Express hierarchy including multiple endpoints.

For example, for root complex 104, a switch 105 can direct traffic to/from endpoint 106, a switch 107 can direct traffic to/from endpoint 108, and switches 107 and 109 can direct traffic to/from endpoints 110 and 111. Similarly, for root complex 115, a switch 116 can direct traffic to/from endpoint 120 and switches 116 and 117 can direct traffic to/from endpoints 118 and 119. In FIG. 1, a peer-to-peer link 130 can also be established between switches 107 and 116, thereby supporting transactions between hierarchy domains. These endpoints, switches, and peer-to-peer link form the "fabric" of the computer systems.

Conventional boots in FIG. 1 are controlled by booting platforms in computer systems 100 and 120 (e.g. in the CPUs and memories). Due to peer-to-peer link 130, some coordination may be desired between the boots of computer systems 100 and 120. Typically, a system administrator manually provides this coordination, thereby adding expense and unpredictability to the combined system. Alternatively, each booting platform could include additional instructions for dealing with the arbitration between computer systems 100 and 120. These additional instructions are very complex, thereby significantly increasing the size and computing resources of each of the booting platforms. Therefore, a need arises for an automatic, efficient boot of computer systems having a peer-to-peer link.

SUMMARY OF THE INVENTION

In accordance with one aspect of the invention, an intelligent endpoint can provide an automated, centralized boot management for multiple, interconnected computer systems. This intelligent endpoint can advantageously resolve arbitration issues in a cost- and size-efficient manner. Moreover, the intelligent endpoint can provide significant flexibility during booting to enforce the most desirable policies.

For example, in accordance with one aspect of the invention, an intelligent endpoint can advantageously participate in the boot decision-making process where and to the extent appropriate (i.e. where allowed and defined by the boot loaders in the systems). For example, in one embodiment, boot loaders in their respective computer systems can perform preliminary boots before authorizing the intelligent endpoint to resolve subsequent boot events.

At that point, an intelligent endpoint, which is connected to one of the computer systems, can be notified of a boot event. This notification can occur over a system bus or via a system fabric. In one embodiment, the system bus or the system fabric conforms to the PCI Express specification. The intelligent endpoint can then decide on an appropriate action for the boot event.

One boot event could relate to platform configuration. In platform configuration, a boot loader can configure certain pieces of equipment in the computer system. The intelligent endpoint could assist the boot loaders in determining which components to boot and in what order such components should be booted.

Another boot event could relate to multi-medium configuration, e.g. network interfaces or physical storage. The intelligent endpoint could assist in decision-making based on protocols for a specific medium.

Yet another boot event could relate to file system and image format. Specifically, each operating system has its own file system and image format. During the boot, a primitive file system and image format structures can be used. The intelligent endpoint could assist the boot loaders in determining which primitive structures are used and how such primitive structures are organized.

Yet another boot event could relate to post-boot considerations. These post boot considerations can include, for example, how the operating system interacts with the boot code, whether certain boot components are kept "alive" during normal operation, proper version control and protection, and extending the service of installable drivers. An intelligent endpoint could assist the boot loaders in these decisions.

The intelligent endpoint can include a boot manager in operative relation to boot intelligence. The boot intelligence can include information regarding possible boots of the computer system. For example, the boot intelligence can include a plurality of startup sequences, secret keys, and/or administrative keys.

Using the boot intelligence, the boot manager can advantageously provide various functionalities. For example, in one embodiment, the boot manager can determine whether a plurality of hard disk drives are in normal state or in suspend state and then allow a user to selectively boot a specific hard disk drive (which could be in normal state or in suspend state).

In another embodiment, the boot manager can facilitate determining whether boot instructions are valid (i.e. not changed by tampering) using a secret key. Specifically, a booting platform in the computer system and the intelligent endpoint can have a common secret key. Once the intelligent endpoint receives a boot request, the boot manager can encrypt the boot instructions stored in the boot intelligence using the secret key. The booting platform can receive the encrypted boot instructions and decrypt these instructions using its corresponding secret key. If the boot instructions are valid, as can be determined by the boot manager or the booting platform, then the booting platform can perform the boot up. Therefore, the intelligent endpoint can advantageously provide security in a computer system.

In yet another embodiment, the boot manager can determine whether non-volatile memory storing boot instructions can be re-programmed. For example, if the computer system determines during startup that its non-volatile memory provided in its boot loader is corrupt, then the booting platform can notify the boot manager of this corruption. At this point, the boot manager can request the boot intelligence for the administrative key and prompt a user for a corresponding administrative key. If the two administrative keys match, then the boot manager can authorize the boot loader to reprogram the non-volatile memory. Therefore, the intelligent endpoint can also ensure that the non-volatile memory used in booting is protected from inadvertent reprogramming.

Furthermore, by properly choosing the time to perform PCI-XP initialization and endpoints enumeration, the invention does not introduce additional price/performance penalty in terms of management overhead. In the near future, when systems are increasingly more complex with various booting methods and method resolutions, how flexible a booting can achieve relies on policy decisions made on pieces of boot and the granularity of booting piecemeal. This invention introduce a modular method to approach booting by inserting Boot Management and Boot Agent between Boot Loader and Boot Intelligence, which are further described below.

In the area of backward compatibility, the invention prescribes possible avenues for reduction to practice. In the case of booting involves security management, the invention suggests that the fabric must be at the same or higher security level than those of the intended choices of booting security. In the aspect of Boot Agent insertion, several possible realizations are possible for different commercial value trade-offs—code rewrite for new release flash or dual-boot, reboot with master boot record modifications, or enforcing the bootcode standard. Thus, the specification in this invention improves prior art.

DETAILED DESCRIPTION OF THE FIGURES

Figure 1:
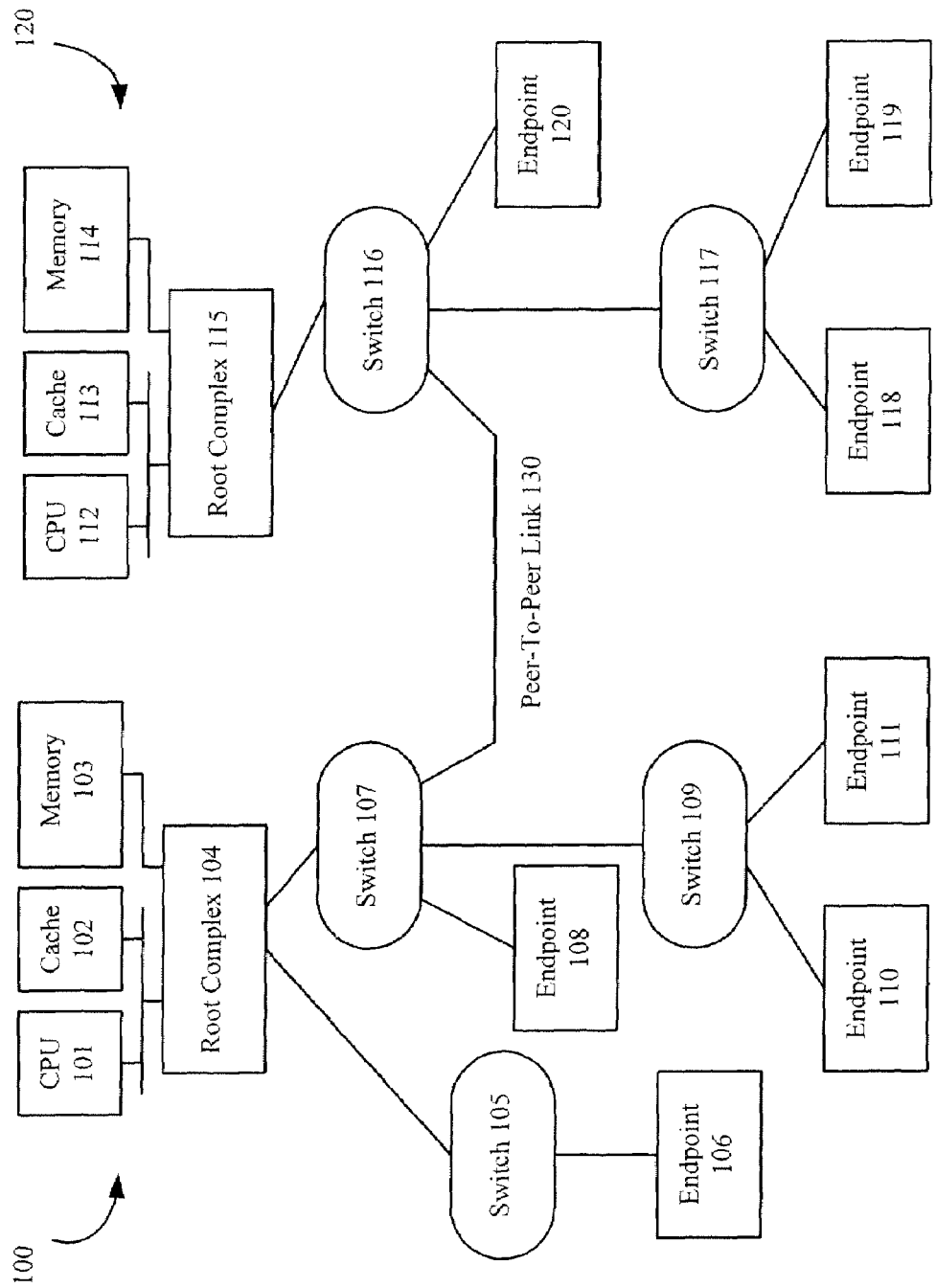
FIG. 1 illustrates an exemplary PCI Express system that includes two computers and multiple endpoints.

To build in additional flexibility into computer systems, a peripheral device to one computer system, called an intelligent endpoint, can assist in the boots of the computer systems. The intelligent endpoint can include a boot manager and boot intelligence. The boot intelligence can include information regarding possible boots of the computer systems. As described in further detail below, this intelligent endpoint can provide enhanced coordination and decision-making for the computer systems.

Of importance, this intelligent endpoint includes firmware, which can provide the necessary storage and processing capability for boot management. In one embodiment, the intelligent endpoint can include flash memory. U.S. Pat. No. 6,148,354, which is incorporated by reference herein, discusses an exemplary flash device using a universal serial bus (USB) connector. U.S. patent application Ser. No. 10/803,597, entitled "PCI Express-Compatible Controller And Interface For Flash Memory", and filed on Mar. 17, 2004 by Super Talent Electronics, Inc., which is also incorporated by reference herein, discusses an exemplary flash device using a PCI Express connector.

In accordance with one aspect of the invention, the intelligent endpoint can leverage the "fabric", i.e. a peer-to-peer link, to provide boot coordination between connected computer systems. Advantageously, this boot coordination can be accomplished without substantial price and/or performance penalties.

In one embodiment, which conforms to protocols in PCI Express, a preliminary boot of each system can be completed. This preliminary boot can include an acknowledgement and configuration of each endpoint associated with its computer system. Thus, after completion of the preliminary boot and referring back to FIG. 1 for illustration, computer system 100 would acknowledge and configure endpoints 106, 108, 110, 111, whereas computer system 120 would acknowledge and configure endpoints 118, 119, and 120. Both computer systems 110 and 120 would note peer-to-peer link 130. At this point, the intelligent endpoint, which could be one of endpoints 106, 108, 110, 111, 118, 119, and 120, can be activated. As described in further detail below, the coordination that the intelligent endpoint can provide may include one or more functions controlling arbitration, security, timing, and overriding policies.

Booting Sequence with Intelligent Endpoint

In any booting sequence, certain issues must be resolved. These issues typically include platform configuration, a multi-medium configuration, file system and image format, and post-boot considerations.

In platform configuration, the boot loader can classify the equipment in its system (e.g. determining the number of CPUs, the number of endpoints, and the types of those endpoints). Of importance, this platform configuration also includes the configuration of the equipment, e.g. which components to boot. In accordance with one aspect of the invention, an intelligent endpoint could assist the boot loader in determining which components to boot and in what order such components should be booted. This accounting/configuration information can then be passed to the operating system for normal operation.

In general, there are two categories of medium. A first medium can include network interfaces, such as (but not limited to) Ethernet, universal serial bus (USB), or PCI Express. A second medium can include physical storage, such as (but not limited to) CD ROM, floppy disk, or hard disk. Note that an auto-boot from the network (i.e. the fabric) can include a plethora of decisions regarding protocols directed to the specific medium. This decision-making is typically complex, which can reflect the intricacy of the network as well as the possible protocols available during the boot. In accordance with one aspect of the invention, an intelligent endpoint could assist in this decision-making.

Each operating system has its own file system and image format. During the boot, a primitive file system (e.g. FAT, NTFS, EXT2, etc.) and image format (e.g. Linux, Microsoft Windows, CD ROM, etc.) structures can be used. The decisions as to which primitive structures are used and how such primitive structures are organized are typically based on reliability. Specifically, these primitive structures should guarantee reliability. In accordance with one aspect of the invention, an intelligent endpoint could assist the boot loader in determining which primitive structures are used and how such primitive structures are organized.

Post boot considerations begin once an operating system is running. These post boot considerations can include (but are not limited to) how the operating system interacts with the boot code, whether certain boot components are kept "alive" during normal operation, proper version control and protection, and extending the service of installable drivers. In accordance with one aspect of the invention, an intelligent endpoint could assist the boot loader in these decisions.

Thus, in general, the intelligent endpoint can advantageously participate in the decision-making process where and to the extent appropriate (i.e. where allowed and defined by the boot loaders in the systems). To provide this function, the intelligent endpoint can gather information and generate resolutions regarding platform configuration, multi-medium configuration, file system and image format, and/or post-boot considerations.

Figure 2A:
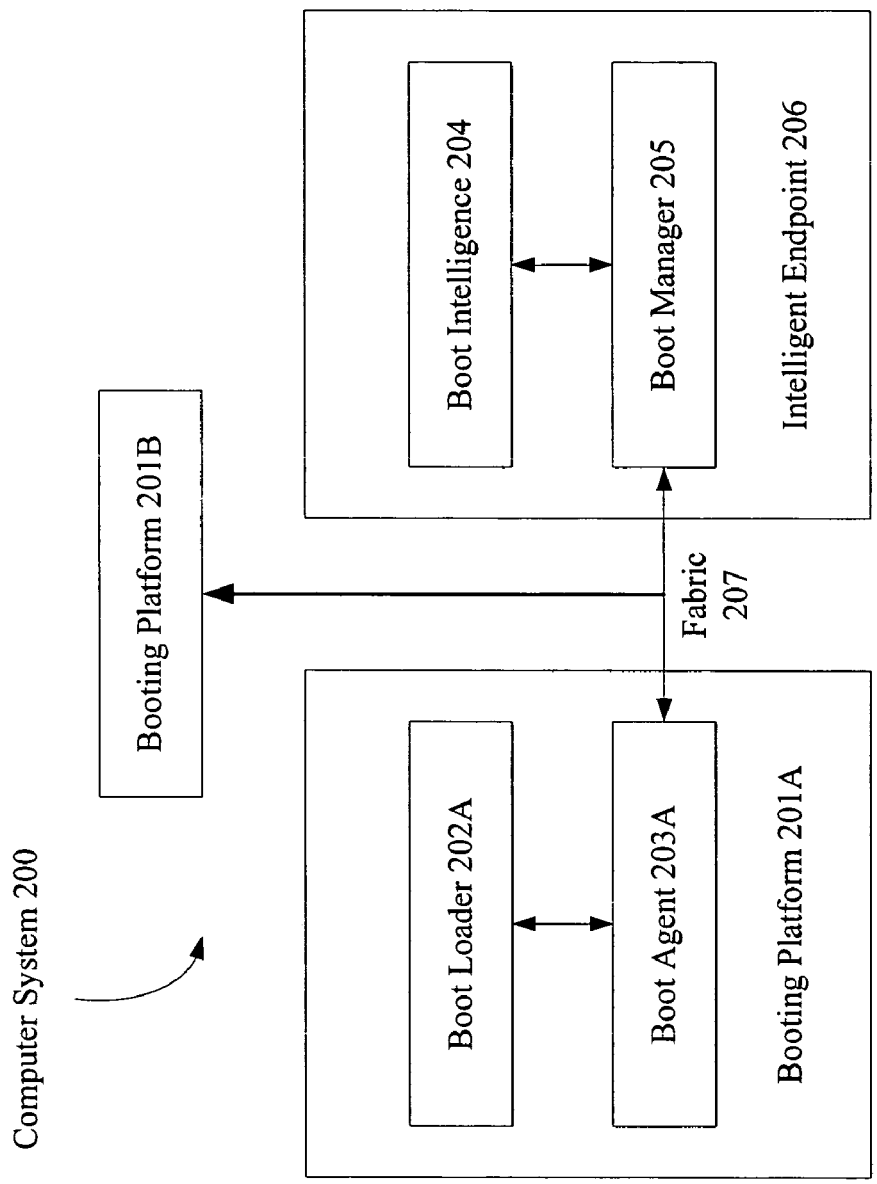
FIG. 2A illustrates a simplified computer system including two booting platforms and an intelligent endpoint, which can advantageously assist during the boots of those platforms.

FIG. 2A illustrates a simplified computer system 200 including a first booting platform 201A, a second booting platform 201B, and an intelligent endpoint 206. Booting platform 201A can include the same components as booting platform 201B, therefore only the components of booting platform 201A are discussed. Booting platform 201A and 201B can be coupled to intelligent endpoint 206 using a fabric 207.

In accordance with one aspect of the invention, intelligent endpoint 206 can include a boot manager 205, which can use boot intelligence 204 to assist booting platform 201A in the boot. A boot agent 203A can provide an interface for booting platform 201A to communicate with boot manager 205. In one embodiment, once the computer is turned on and a preliminary boot is complete, boot loader 202 can communicate with boot manager 205 (via boot agent 203) and request assistance in the boot.

Note that in some embodiments, boot agent 203A can be integrated into boot loader 202A. In other embodiments concerned with backwards compatibility or with optionally deactivating intelligent endpoint 206, boot agent 203A can be kept separate from boot loader 202A. Notably, the level of detail in decision-making provided in boot loader 202A can be reflected in boot agent 203A. The level of detail in the decision-making process is called the granularity of boot loader 202A/boot agent 203A. Boot agent 203A can be implemented using software, firmware, hardware, or a combination thereof.

Exemplary Sequence of Events for Boots with Intelligent Endpoint

Boot manager 205 can actively manage one or more aspects of the boot on behalf of booting platforms 201A and 201B. To provide this management capability, boot intelligence 204 can store a plurality of instructions for the boot. In one embodiment, after a preliminary boot, boot agent 203A can note that intelligent endpoint 206 is coupled to booting platform 201A using fabric 207 and is requesting authorization to assist in the boot. Boot agent 203A can pass this information to boot loader 202A, and then allow boot loader 202A to determine whether to use intelligent endpoint 206 in the boot.

Figure 2D:
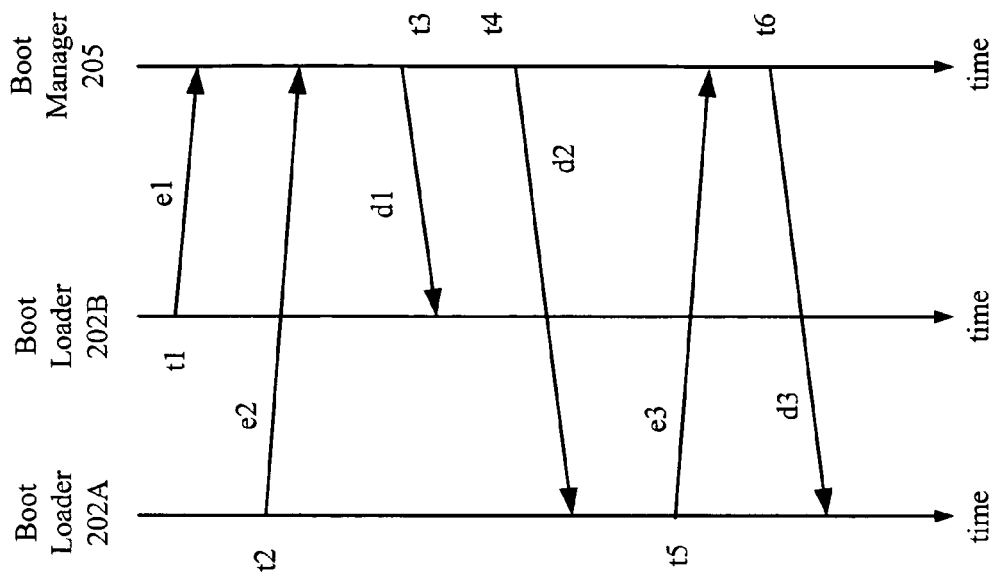
FIG. 2D illustrates one example of multiple boot loaders providing events to a boot manager and the response of that boot manager.
Figure 2C:
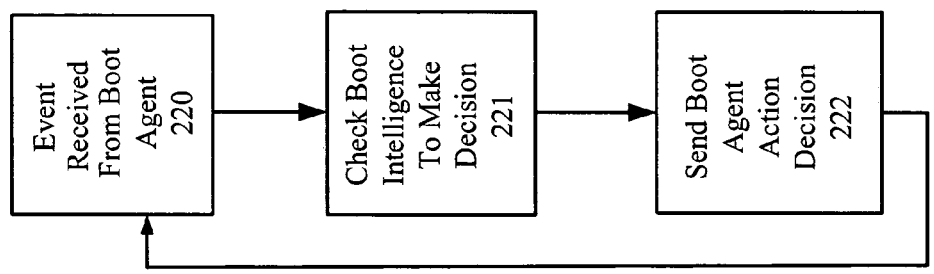
FIG. 2C illustrates an exemplary event-decision-action model for a boot manager that is authorized to operate with the boot loader.
Figure 2B:
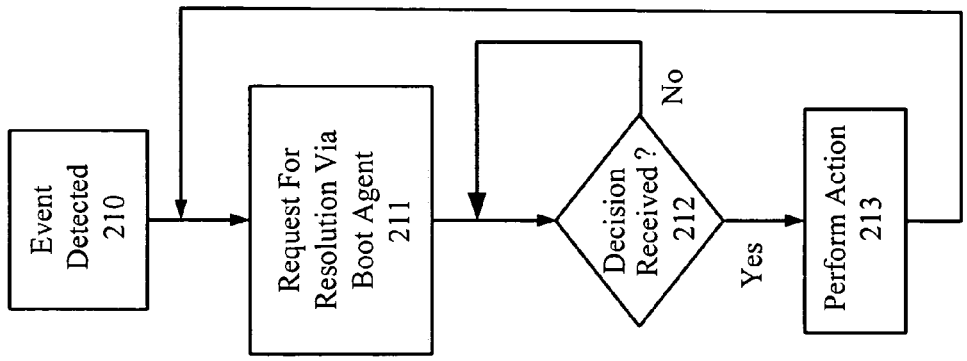
FIG. 2B illustrates an exemplary event-decision-action model for a boot loader that has authorized operation with the intelligent endpoint.

FIG. 2B illustrates an exemplary event-decision-action model for a boot loader that has authorized operation with the intelligent endpoint. In this model, an event is detected in step 210, wherein an event refers to a decision node in the boot. In step 211, a request for resolution of that event can be received from the intelligent endpoint via the boot agent. Once a decision is received from the intelligent endpoint, as determined in step 212, the boot loader can perform the action provided by the decision. The boot loader is then ready to detect the next event.

FIG. 2C illustrates an exemplary event-decision-action model for a boot manager that is authorized to operate with the boot loader. In this model, the detected event is received from the boot agent in step 220. At this point, the boot manager can check the boot intelligence to make a decision associated with the event in step 221. In step 222, the boot manager can send the boot agent the action decision. The boot manager is then ready to receive the next event.

FIG. 2D illustrates one example of multiple boot loaders providing events to a boot manager and the response of that boot manager. At time t1, boot loader 202B (provided in booting platform 201B of FIG. 2A) detects an event e1 and passes that event to boot manager 205. At time t2, boot loader 202A (provided in booting platform 201A) detects an event e2 and also passes that event to boot manager 205. By time t3, boot manager 205 has consulted its boot intelligence (i.e. boot intelligence 204) and has a decision d1 ready to send back to boot loader 202B, wherein decision d1 is associated with event e1. Similarly, by time t4, boot manager 205 has a decision d2 ready to send back to boot loader 202A, wherein decision d2 is associated with event e2.

In this embodiment, decisions for events are handled in a first-in-first-out basis, e.g. the decision d1 is sent to boot loader 202B before the decision d2 is sent to boot loader 202A because event e1 is received before event e2 (note that FIG. 2D indicates some delay for the event/decision to be transferred, although this delay would typically be insignificant. However, in other embodiments, the decisions can be sent as soon as they are generated irrespective of time of receipt.

Note that the delay between receipt of an event and its associated decision, e.g. between events e1, e2, e3 and decisions d1, d2, d3, respectively, depends on the time needed to process the appropriate information in the boot intelligence and therefore may vary from event to event.

In one embodiment, a boot up process can be retriggered when a computer system is running and an initial boot has already been performed (sometimes called a warm boot). This reboot decision can be made by intelligent endpoint 206. For example, assuming that an intelligent endpoint is present, then boot agent 203A can be instructed by boot loader 202A to maintain contact with boot manager 205. In this manner, should a warm boot be needed, intelligent endpoint 206 can advantageously provide the appropriate instructions stored in boot intelligence 204 to facilitate the desired boot. Therefore, intelligent endpoint 206 can provide, in effect, a dynamically reconfigurable boot policy to booting platform 201A as long as coupling between booting platform 201A and intelligent endpoint 206 is maintained across fabric 207.

An intelligent endpoint can selectively provide the boot loader with an appropriate startup sequence based on an actual power on mode. Specifically, a power on can occur because of different events. Exemplary events include, for example, a serial port power on, a modem power on, a wake on alarm power on, and a wake on LAN power on. Each power on event may have an associated, preferred startup sequence, i.e. an ordered list of initial program load devices to be activated.

Figure 3:
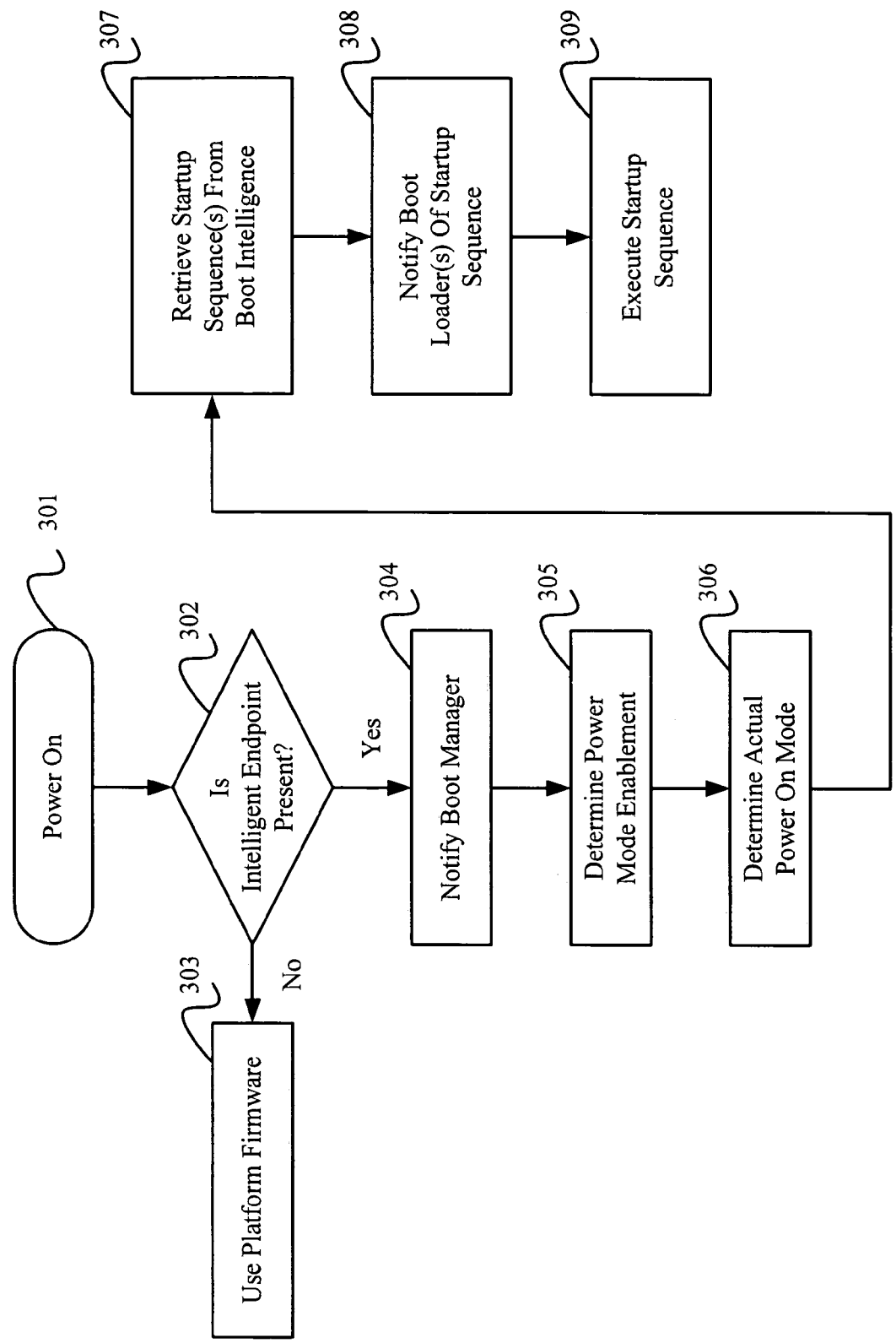
FIG. 3 illustrates how an intelligent endpoint can be used to determine the appropriate startup sequence based on a specific type of power on event.

FIG. 3 illustrates how an intelligent endpoint can be used to determine the appropriate startup sequence based on a specific type of power on event. In step 301, a booting platform detects a power on event. If an intelligent endpoint is present, e.g. coupled to the booting platform, as determined in step 302, then the booting platform can notify the intelligent endpoint of the power on event in step 304.

In step 305, the intelligent endpoint (controlled by the boot manager and using information provided by the boot agent) can determine whether specific power modes have been enabled. For example, a serial port power on mode may not be enabled in a specific system, but a modem power on mode may be enabled. If a power on mode is enabled, then the intelligent endpoint (once again controlled by the boot manager and using information provided by the boot agent) can determine the actual power on mode in step 306. In other words, even if a specific power mode is enabled, that mode may not be the one responsible for the power on event. U.S. Pat. No. 5,860,001, which is incorporated by reference herein, describes one embodiment for performing steps 305 and 306.

Once the actual power on mode is determined, the intelligent endpoint can retrieve the appropriate startup sequence from its boot intelligence in step 307. In one embodiment, the boot intelligence can be implemented using a look-up table (LUT) that allows the boot manager to determine the appropriate ordered list of IPL devices to be used during boot up based on the actual power on mode. Note that the intelligent endpoint can have its own list of IPL devices that can supplement or replace the standard lists used by the boot loader. Therefore, as new power on methods become available, an intelligent endpoint can allow users to select the appropriate IPL devices without reprogramming of the booting platform.

In one embodiment, the intelligent endpoint can assist in coordinating the power on sequence for multiple booting platforms. In this case, the boot agent can still retrieve the appropriate sequence from the boot intelligence (step 307) and notify the boot loaders of their respective startup sequences (step 308). In step 309, the boot loader(s) can execute the startup sequence(s). Note that if an intelligent endpoint is not present (step 302), then the booting platform can use its platform firmware in step 303, as is conventionally done.

Some computer systems may have multiple hard disk drives having different operating systems available for boot up. Once a computer system recognizes the presence of multiple hard disk drives, the intelligent endpoint can advantageously determine which of these hard disk drives should be booted.

Figure 4A:
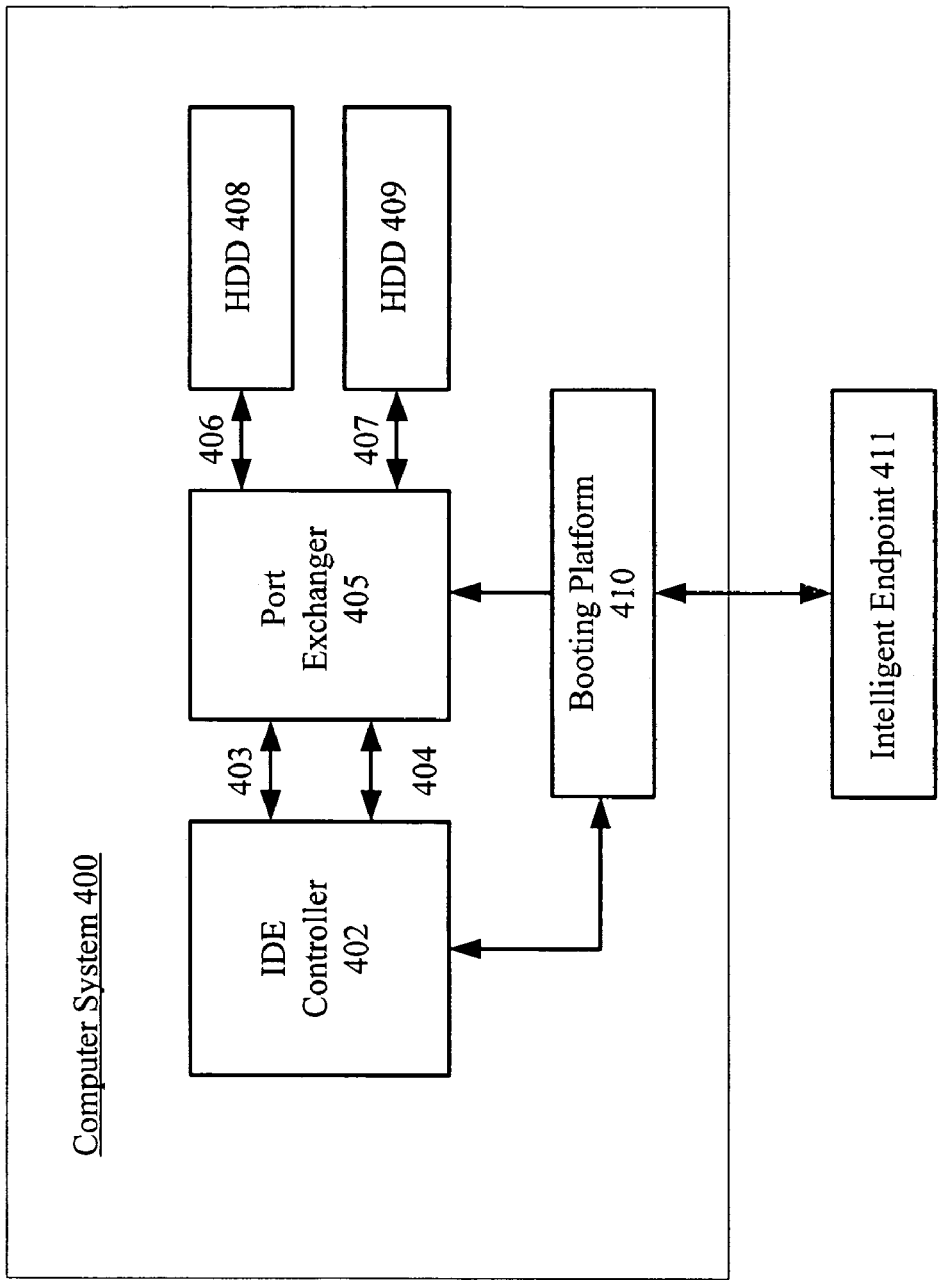
FIG. 4A illustrates a computer system including two bootable hard disk drives, of which one will be designated a "master" and the other will be designated a "slave".

FIG. 4A illustrates a computer system 400 including two bootable hard disk drives 408 and 409, of which one will be designated a "master" and the other will be designated a "slave". In computer system 400, an integrated drive electronics (IDE) controller 402 can provide signals on master signal lines 403 as well as on slave signal lines 404. A port exchanger 405 can receive the signals provided on lines 403 and 404 and direct those signals on lines 406 and 407 to hard disk drives 408 and 409, respectively. A booting platform 410 can send the triggering signal to IDE controller 402 to begin the boot as well as send the appropriate exchange signal to port exchange 405, thereby designating the master hard disk drive for booting. U.S. Pat. No. 6,088,794, which is incorporated by reference herein, describes IDE controller 402 and port exchanger 405 in detail.

Figure 4B:
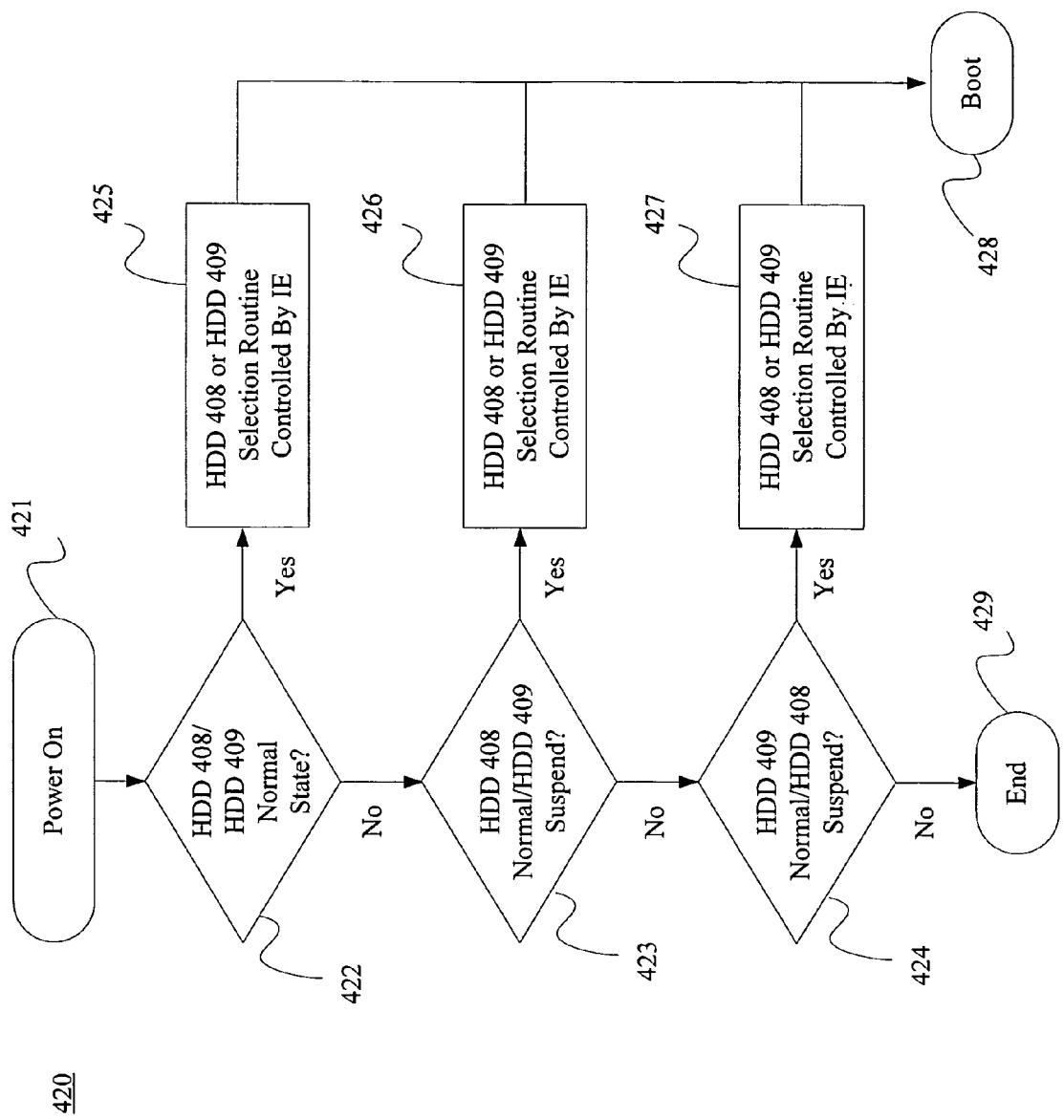
FIG. 4B illustrates how an intelligent endpoint can advantageously control the selection of the hard disk drives shown in FIG. 4A.

An intelligent endpoint 411 can advantageously control the selection of the hard disk drive using a method 420 illustrated in FIG. 4B. In step 421, the computer is powered on. In step 422, a determination is made whether HDD 408 and HDD 409 are in normal state (versus a suspend state). If both HDDs 408 and 409 are in normal state, then an intelligent endpoint can select the appropriate HDD to use in the boot up in step 425. In one embodiment, the intelligent endpoint could perform this selection by first indicating to a user that both drives are in normal state and then querying the user as to which drive should be used.

If both HDDs 408 and 409 are not in normal state, then method 420 can proceed to step 423. In step 423, a determination is made whether HDD 408 is in normal state and HDD 409 is in suspend state. If so, then the intelligent endpoint can select the appropriate HDD to use in the boot up in step 426. In one embodiment, the intelligent endpoint could perform this selection by first indicating to a user that HDD 408 is in normal state while HDD 409 is in suspend state and then querying the user as to which drive should be used.

If HDD 408 is not in normal state and HDD 409 is not in suspend state, then method 420 can proceed to step 424. In step 424, a determination is made whether HDD 409 is in normal state and HDD 408 is in suspend state. If so, then the intelligent endpoint can select the appropriate HDD to use in the boot up in step 427. In one embodiment, the intelligent endpoint could perform this selection by first indicating to a user that HDD 409 is in normal state while HDD 408 is in suspend state and then querying the user as to which drive should be used.

Once a hard disk drive is selected in one of steps 425, 426, and 427, the boot up can proceed in step 428. This boot up can include having the intelligent endpoint generate the appropriate exchange signal for the port exchanger via the booting platform. If HDD 409 is not in normal state and HDD 408 is not in suspend state, as determined in step 424, then a fatal error has probably occurred and method 420 can end in step 429.

Note that hard disk selection method 420 is equally applicable to multiple booting platforms. For example, hard disk drive 408 could be associated with one booting platform while hard disk drive 409 could be associated with another booting platform (not shown in FIG. 4A). Thus, the intelligent endpoint could efficiently ensure that the appropriate hard disk drive is selected even when multiple booting platforms are present.

In accordance with one aspect of the invention, the intelligent endpoint can include a secret key corresponding to another secret key in the boot loader. The intelligent endpoint can store the boot up instruction code in the boot intelligence. By using the secret keys, unauthorized boot up instruction code cannot be used, thereby ensuring a secure computer system environment.

Figure 5A:
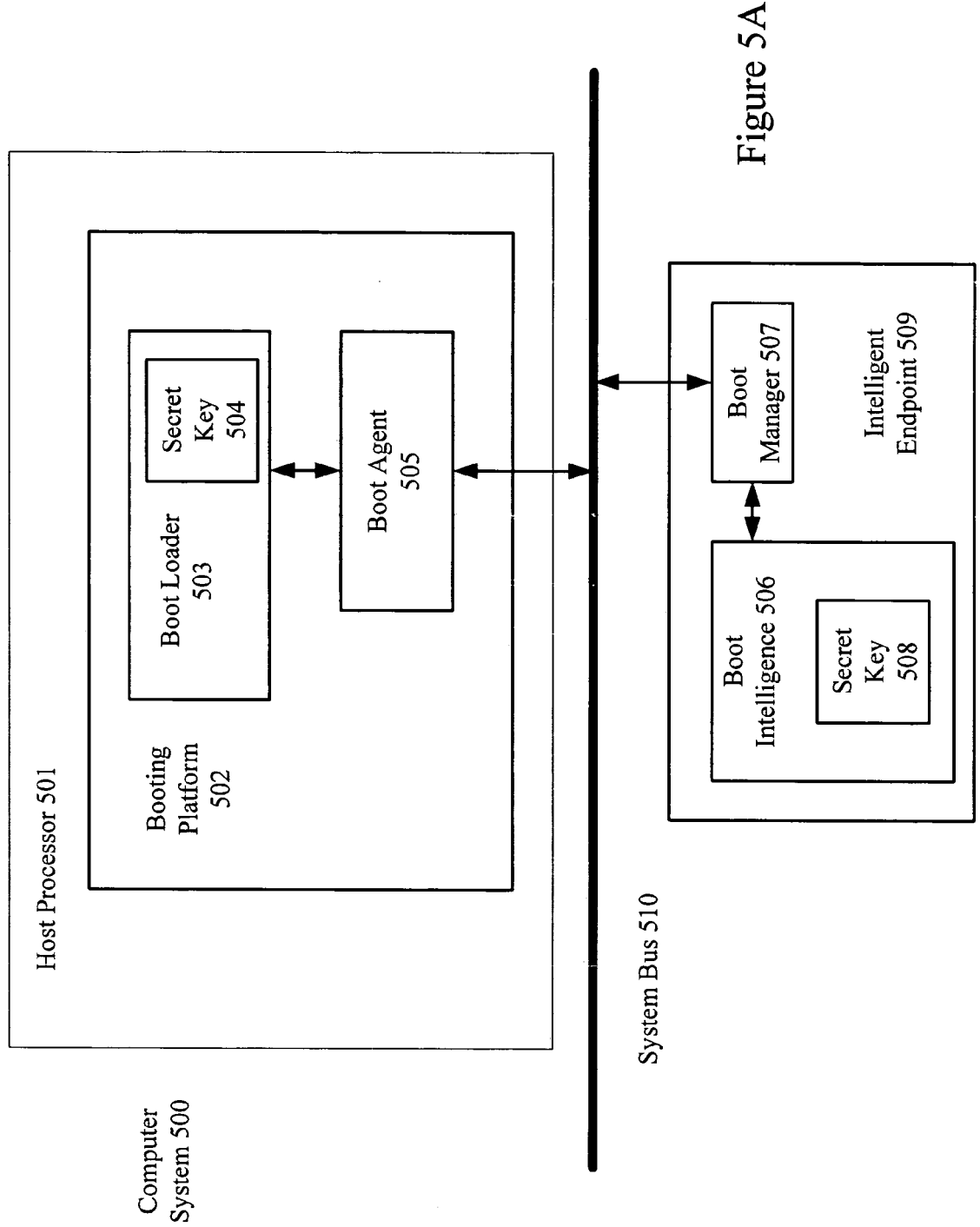
FIG. 5A illustrates a computer system including a host processor and an intelligent endpoint coupled via a system bus.

FIG. 5A illustrates a computer system 500 including a host processor 501 and an intelligent endpoint 509 coupled via a system bus 510 (e.g. a PCI Express bus). Host processor 501 includes a secret key 504, which could be stored in non-volatile memory. Of importance, intelligent endpoint 509 can also include a secret key 508, which is identical to secret key 504, in its boot intelligence 506. In one embodiment, boot intelligence 506 also stores secret key 508 in non-volatile memory. U.S. Pat. No. 5,937,063, which is incorporated by reference herein, describes this secret key pair in further detail.

As described above in reference to FIG. 2, a boot manager 507 can control the boot process by serving as an active interface between boot intelligence 506 and a booting platform 502 of host processor 501. Booting platform 502 includes a boot agent 505 that can detect the presence of boot manager 507 on system bus 510 and allows intelligent endpoint 509 to take control of the boot as described in FIG. 5B.

In one embodiment, intelligent endpoint 509 can include multiple secret keys. In this case, each secret key in intelligent endpoint 509 corresponds to a secret key in a specific booting platform. Each booting platform can be directly connected to or indirectly coupled to system bus 510.

Figure 5B:
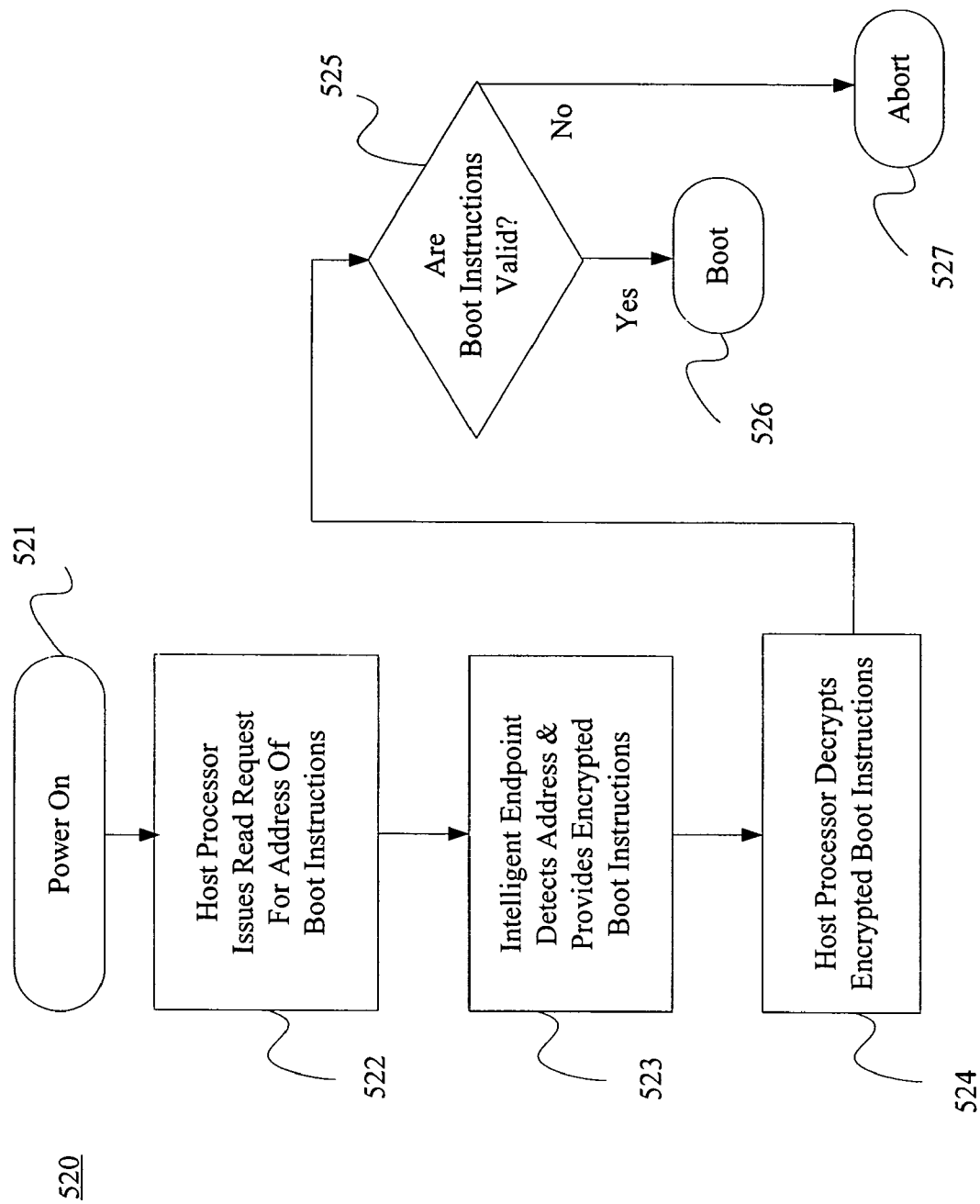
FIG. 5B illustrates an exemplary boot up process using an intelligent endpoint as a security device.

FIG. 5B illustrates an exemplary boot up process 520 using an intelligent endpoint as a security device. In step 521, a power on event occurs. In step 522, the host processor can issue a read request for an address corresponding to its boot instructions. In one embodiment, the boot agent can issue this read request to the boot manager. In step 523, the boot manager of the intelligent endpoint can detect this address. Additionally, the boot manager can encrypt the boot instructions stored in the boot intelligence using its secret key and then send the encrypted boot instructions back to the boot agent.

In step 524, the boot agent can decrypt the encrypted boot instructions. If the boot instructions are valid, as determined in step 525, then the boot loader can perform the boot in step 526. Otherwise, process 520 aborts in step 527. Note that the intelligent endpoint or the boot agent could determine the validity of the boot instructions.

Figure 6:
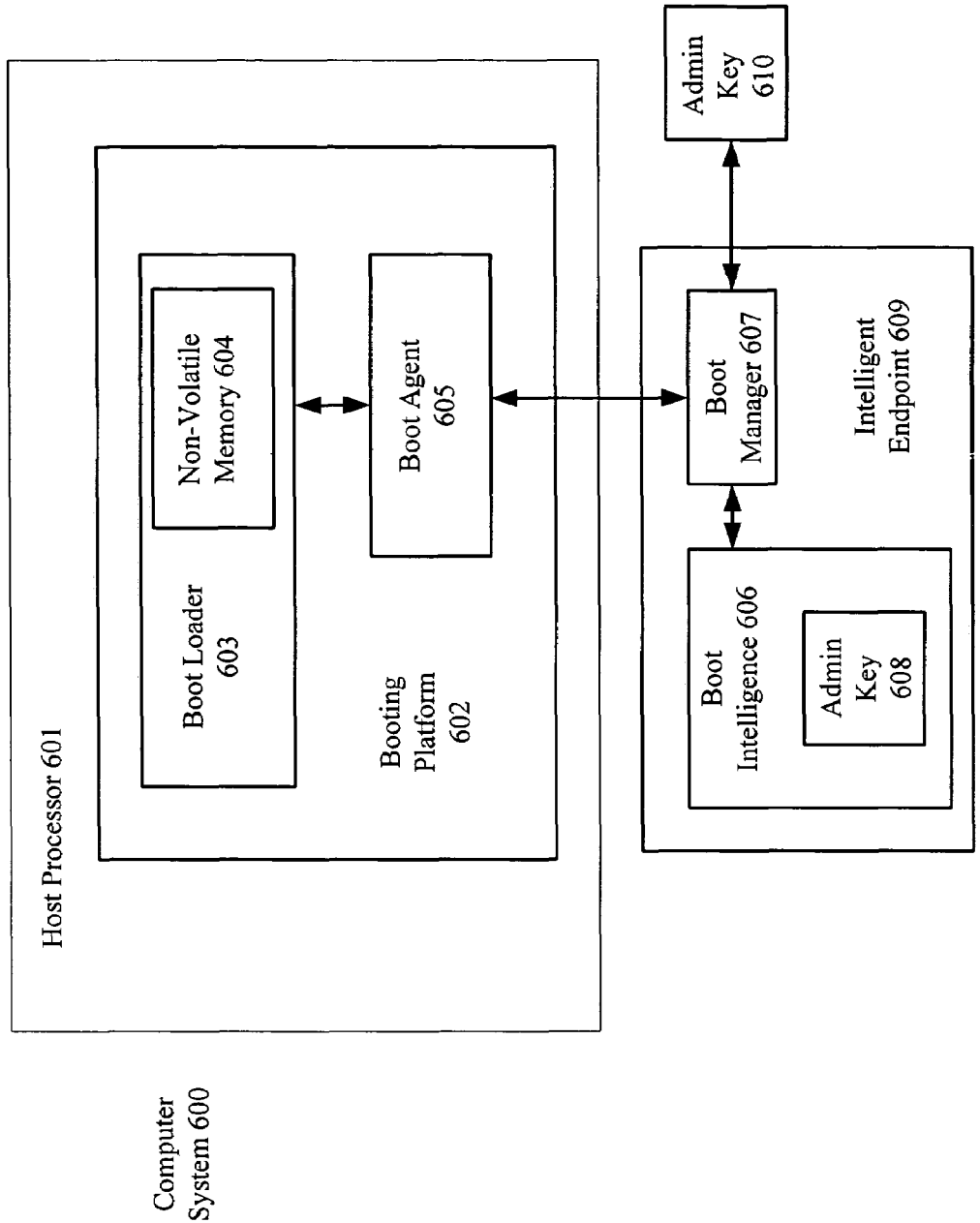
FIG. 6 illustrates a computer system including an intelligent endpoint that can store an administrative key in its boot intelligence to authorize reprogramming of a corrupted non-volatile memory.

In accordance with another aspect of the invention, the intelligent endpoint can facilitate reprogramming of a corrupted non-volatile memory used to store booting instructions. FIG. 6 illustrates a computer system 600 including an intelligent endpoint 609 that can store an administrative key 608 in its boot intelligence 606 to authorize this reprogramming. For example, if host processor 601 determines during startup that its non-volatile memory 604 (provided in boot loader 603) is corrupt, then boot agent 605 can notify boot manager 607 of this corruption. At this point, boot manager 607 can request boot intelligence 606 for administrative key 608 and prompt a user for a corresponding administrative key 610.

If administrative keys 608 and 610 match, then boot manager 607 can authorize boot loader 603 to reprogram non-volatile memory 604. On the other hand, if administrative keys 608 and 610 do not match, then boot manager 607 can ensure that non-volatile memory 604 is not reprogrammed. U.S. Pat. No. 6,240,519, which is incorporated by reference herein, describes these administrative keys in further detail.

In one embodiment, intelligent endpoint 609 can include multiple administrative keys. In this case, each administrative key in intelligent endpoint 609 can be associated with the reprogramming of the non-volatile memory in a specific booting platform. Each booting platform can be connected to boot manager 607.

Note that in the techniques described in reference to FIGS. 5B and 6, the intelligent endpoint must be at the same or higher security level than those of the intended choices of booting security.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, the term "platform" can include, but is not limited to, a personal computer (PC) having an operating system such as DOS™, Windows™, OS/2™, or Linux; a Macintosh™ computer; a computer having JAVA™ having -OS as the operating system; and graphical workstations such as the computers of Sun Microsystems and Silicon Graphics, and other computers having some version of the UNIX operating system such as AIX™ or SOLARIS™ of Sun Microsystems; or any other known and available operating system, including operating systems such as Windows CE™ for embedded systems, including cellular telephones, handheld computational devices and palmtop computational devices, and any other computational device which can be connected to a network.

In one embodiment, although the intelligent endpoint can effectively leverage the peer-to-peer link as shown in the fabric of FIG. 1, the intelligent endpoint can also be applied to a universal standard bus (USB) having an on-the-go (OTG) specification (as provided in the USB Standard V2.0 (USB-V2)). U.S. Pat. No. 6,148,354 describes an exemplary USB architecture that could benefit from the use of intelligent endpoints. Note that in another embodiment, the Internet Protocol (IP) can be used for interoperability for communication between the boot agent and the boot manager.

Flash memory cards such as Express Card, Mini PCI Express Card, Secure Digital Card, Multi Media Card, Memory Stick Card and Compact Flash Card can be candidates for intelligent endpoints. Although these cards do not have a fabric, they do have serial interfaces. The intelligent endpoint can also apply to the other endpoints based on serial buses, e.g. the serial ATA Bus, SCSI attached storage bus, IEEE 1394 bus and Ethernet bus.

In principle, the invention is readily extended to multiple boot managers in a hierarchical structure where there is a single manager with highest authority in boot decision policy enforcement. Furthermore, the invention is extended to the embodiments where roles of endpoints and platforms (or alternately BL/BA and BM/BI) are exchanged, keeping one boot manager, because the unification of the serial interconnection preserves the uniform, convenient, and inexpensive boot management.

Accordingly, it is intended that the scope of the invention be defined by the following Claims and their equivalents.

The invention claimed is:

1. A method of performing boots for multiple, interconnected computer systems, the method comprising:
notifying an intelligent endpoint of a boot event for a computer system, the intelligent endpoint being connected to one of the computer systems, wherein the intelligent endpoint is a peripheral device; and
deciding on an action for the boot event using the intelligent endpoint, wherein deciding includes determining whether the action affects or depends on a boot of another computer system.

2. The method of claim 1, wherein the boot event relates to platform configuration.

3. The method of claim 2, wherein the intelligent endpoint can determine which components in the computer systems to boot and in what order the components should be booted.

4. The method of claim 1, wherein the boot event relates to multi-medium configuration.

5. The method of claim 4, wherein the intelligent endpoint could assist in decision-making based on protocols for a specific medium.

6. The method of claim 1, wherein the boot event relates to file system and image format.

7. The method of claim 6, wherein the intelligent endpoint can determine which primitive structures are used and how the primitive structures are organized.

8. The method of claim 1, wherein the boot event relates to post-boot considerations.

9. The method of claim 8, wherein post-boot considerations can include at least one of:
how an operating system interacts with boot code;
whether certain boot components are kept "alive" during normal operation;
proper version control and protection; and
extending service of installable drivers.

10. The method of claim 1, wherein notifying the intelligent endpoint includes communicating over a system bus or a system fabric.

11. The method of claim 10, wherein the system bus or the system fabric conforms to the PCI Express specification.

12. The method of claim 1, wherein deciding on an action for the boot includes:
using a boot manager in the intelligent endpoint to access boot intelligence.

13. The method of claim 12, wherein boot intelligence includes a plurality of startup sequences.

14. The method of claim 12, wherein controlling the boot includes determining whether a plurality of hard disk drives are in normal state or in suspend state.

15. The method of claim 12, wherein controlling the boot includes facilitating determining whether boot instructions are valid.

16. The method of claim 12, wherein controlling the boot includes determining whether non-volatile memory storing boot instructions can be re-programmed.

17. An intelligent endpoint being connectable to a computer system and at least one other computer system via a fabric, the intelligent endpoint comprising:
a boot manager for assisting a booting platform of each of the computer systems via the fabric, the fabric including at least one peer-to-peer link; and
boot intelligence for storing information regarding boots of the computer systems, wherein the boot manager and the boot intelligence form a peripheral device.

18. The intelligent endpoint of claim 17, wherein the boot manager is coupled to receive a boot event from the booting platform.

19. The intelligent endpoint of claim 18, wherein the boot event relates to platform configuration.

20. The intelligent endpoint of claim 19, wherein the intelligent endpoint can access information in the boot intelligence regarding which components in the computer systems to boot and in what order the components should be booted.

21. The intelligent endpoint of claim 18, wherein the boot event relates to multi-medium configuration.

22. The intelligent endpoint of claim 21, wherein the intelligent endpoint assists in decision-making based on protocols for a specific medium.

23. The intelligent endpoint of claim 18, wherein the boot event relates to file system and image format.

24. The intelligent endpoint of claim 23, wherein the intelligent endpoint can access information in the boot intelligence regarding which primitive structures are used and how the primitive structures are organized.

25. The intelligent endpoint of claim 18, wherein the boot event relates to post-boot considerations.

26. The intelligent endpoint of claim 17, wherein the boot manager is connectable to the fabric usable by the at least one other computer system.

27. The intelligent endpoint of claim 17, wherein boot intelligence stores a plurality of startup sequences.

28. The intelligent endpoint of claim 17, wherein the boot manager can access information in the boot intelligence regarding whether to boot a hard disk drive in a computer system in one of a normal state and a suspend state.

29. The intelligent endpoint of claim 17, wherein the boot manager can facilitate determining whether boot instructions for a computer system are valid.

30. The intelligent endpoint of claim 17, wherein the boot manager can access information in the boot intelligence regarding whether non-volatile memory storing boot instructions in a computer system can be re-programmed.

31. A computer system comprising:
a booting platform for a computer; and
an intelligent endpoint operatively coupled to the computer via a system fabric, the intelligent endpoint managing at least a portion of a boot of the computer, wherein the intelligent endpoint is a peripheral device,
wherein the booting platform includes:
a boot loader for physically performing the boot; and
a boot agent for communicating with the boot loader during a boot,
wherein the intelligent endpoint includes:
a boot manager for communicating with the boot agent across the system fabric; and
boot intelligence for storing information regarding a boot of the computer system, the boot manager communicating with the boot intelligence, wherein the boot intelligence includes at least one of a plurality of startup sequences, secret keys, and administrative keys.

32. The computer system of claim 31, wherein the boot manager can determine whether to boot a hard disk drive in the computer system, the hard disk drive being one of a normal state and a suspend state.

33. The computer system of claim 31, wherein the boot manager can facilitate determining whether boot instructions for the computer system are valid.

34. The computer system of claim 31, wherein the boot manager can determine whether non-volatile memory storing boot instructions in the computer can be re-programmed.

35. The intelligent endpoint of claim 31, wherein the boot manager is coupled to receive a boot event from the booting platform.

36. The intelligent endpoint of claim 35, wherein the boot event relates to platform configuration.

37. The intelligent endpoint of claim 36, wherein the intelligent endpoint can access information in the boot intelligence regarding which components in the computer system to boot and in what order the components should be booted.

38. The intelligent endpoint of claim 35, wherein the boot event relates to multi-medium configuration.

39. The intelligent endpoint of claim 38, wherein the intelligent endpoint assists in decision-making based on protocols for a specific medium.

40. The intelligent endpoint of claim 35, wherein the boot event relates to a file system and an image format in the computer.

41. The intelligent endpoint of claim 40, wherein the intelligent endpoint can access information in the boot intelligence regarding which primitive structures are used and how the primitive structures are organized.

42. The intelligent endpoint of claim 35, wherein the boot event relates to post-boot considerations.

* * * * *